350-96.28        SR
     XR    3,670,157

[15]    3,670,157

Bragg

[45] June 13, 1972

[54] REFLECTIVE CONDENSING SYSTEM FOR CONCENTRATING ILLUMINATION AT AN APERTURE

[72] Inventor: Herbert E. Bragg, Mansfield Township, Warren County, N.J.

[73] Assignee: De Luxe General Incorporated, New York, N.Y.

[22] Filed: Oct. 28, 1970

[21] Appl. No.: 84,720

Related U.S. Application Data

[63] Continuation-in-part of Ser. No. 739,772, June 25, 1968, abandoned.

[52] U.S. Cl..........................240/41.35, 240/1.3, 350/96 T, 352/198
[51] Int. Cl............................................F21v 7/00
[58] Field of Search.........................355/119, 66; 350/96 T; 240/7.1, 20, 41.4, 1.3, 41.35; 352/198

[56]     References Cited

UNITED STATES PATENTS

| 3,508,827 | 4/1970 | Feiler | 355/124 |
| 3,263,070 | 7/1966 | Hine | 352/198 X |
| 3,514,200 | 5/1970 | Bowker | 350/96 OT |
| 3,469,914 | 9/1969 | Thomson | 355/32 |
| 1,944,111 | 1/1934 | Shieren | 350/96 OT |

FOREIGN PATENTS OR APPLICATIONS

| 523,097 | 4/1955 | Italy | 350/96 OT |

*Primary Examiner*—Samuel S. Matthews
*Assistant Examiner*—Richard L. Moses
*Attorney*—Albert M. Parker, C. G. Mueller, L. P. Brooks, A. L. Haffney, Jr., H. Haidt and G. T. Delahunty

[57]     ABSTRACT

The final condensing lens element, commonly used in a system for concentrating light at an aperture, is replaced by light restricting path means forming a transversely unobstructed, open ended light path. Spaced, opposed front surface mirrors define a portion of the path along which light is reflected back and forth between the mirror surfaces to emerge at the open end as a uniform flood of light. The absence of transverse surfaces avoids any collecting of dirt which would cause streaks to be printed on film printed with the concentrated light.

4 Claims, 9 Drawing Figures

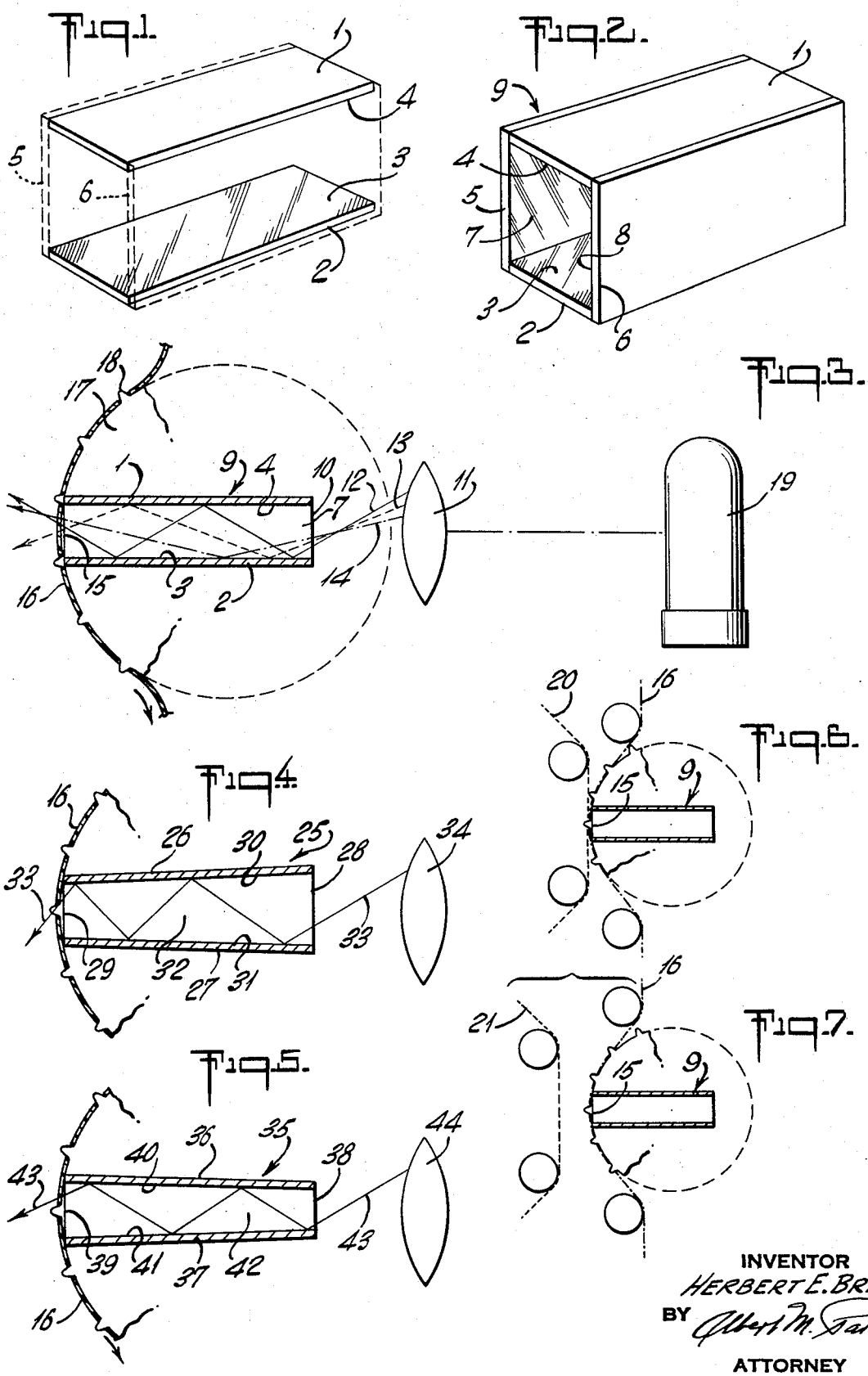

INVENTOR.
HERBERT E. BRAGG
BY
Albert M. Parker
ATTORNEY.

3,670,157

REFLECTIVE CONDENSING SYSTEM FOR CONCENTRATING ILLUMINATION AT AN APERTURE

CROSS REFERENCE TO RELATED APPLICATION

This application is a Continuation-in-Part of applicant's copending application Ser. No. 739,772, now abandoned filed June 25, 1968 and entitled "Reflective Condensing System for Concentrating Illumination at an Aperture."

BACKGROUND OF THE INVENTION

1. Field of the Invention

The present invention relates to an optical system for condensing light to produce a uniform concentrated light beam at an aperture, and especially to an improved reflective condensing system which may be advantageously used in printing motion picture films. 2. Description of the Prior Art Heretofore, in optical systems utilized in apparatus such as contact or projection printers for making continuous copies of motion picture films, difficulties have arisen due to particles of airborne dirt settling on the surface of the lens, light diffusing plate, or other element closest to the printing aperture. This surface may be flat, convex, or concave and may generally be considered as being transverse to the light path as well as parallel to and close to the film passing the printing aperture. Dust is attracted to any such transverse surface due to the accumulation of the electrostatic charges associated with the frictional effects of the films riding together over the aperture.

It is practically impossible to keep the air completely free of dust particles and this is particularly so when a principal source of the particles is the edges of the film itself. Efforts have been made to dispel the charges that collect these particles through the use of alpha particles emitters, but besides being costly, this practice is not very satisfactory. The presence of the particles on a surface through which the light beam passed near the aperture results in at least a partial blocking of the light passing through the condenser on the way to the film and, inasmuch as the film is moving, this blocking causes continuous streaks to be printed in the prints being made from the negative through which the light passes.

SUMMARY OF THE INVENTION

The present invention provides a solution to the prior art problem of streaks resulting in film being printed due to dust particles on a transverse surface in the light path by a completely novel approach to light condensing. No transverse lens, light diffusing plate or other surface upon which particles could collect is positioned near the aperture passed by the film to be printed. Instead of employing lenses, prisms and/or light diffusing plates the invention presents an open light path between front surface mirrors. Light is introduced into the path at an end remote from the aperture, directed thence by a suitable lens, to strike the reflective front mirror surface at an angle. The light is reflected back and forth between opposed mirror surfaces on opposite sides of the path as it travels toward the aperture. Since all of the introduced light does not strike the mirror surface at exactly the same angle, there will be a multitude of light rays reflected along the path at different angles to emerge as an uniform flood of light at the aperture. Because of the multiplicity of light rays passing along between the opposed mirrors of the path, and the fact that the different rays are reflected at mutually different angles along the path, any dust which might collect on a mirror surface will have no effect on he printing process. In other words the dust will not be imaged at the film and will not obstruct the light traveling toward the aperture so as to produce a dark spot which would cause a streak on the moving film. The effect of any single particle on any particular light ray will be lost in the multitude of reflections so that a uniform flood of light illuminates the film at the aperture.

The opposed mirrors defining the portion of the path along which light rays are reflected back and forth may be thought of as sides of a tube, although in practice only two opposed plane mirrors are preferably used. The mirrors may be positioned parallel to each other or may define a tapering passage which is wider at its entrant or exit end. Front surface mirrors are preferably used, since with morrors which are silvered on their backs, the light suffers refraction at the front surface both before and after reflection at the back surface.

Though the invention is illustrated in the accompanying drawing and will be described from the standpoint of utilization in either contact or optical printing of positive films from negatives, it is to be understood that its utilization is not necessarily so limited since it may be employed in any optical system where the problems to be overcome are those set forth herein.

The preferred and various other embodiments of the invention are set forth in the accompanying drawing and will be described in the description to follow.

BRIEF DESCRIPTION OF THE DRAWING

FIG. 1 is a perspective view of a condenser tube having a pair of parallel opposed top and bottom plates having interior reflective surfaces, with the sidewalls just dotted in, illustrative of path means according to the invention in the form of a condenser tube whose top and bottom surfaces only are formed to effect reflection of light between them.

FIG. 2 is another perspective view illustrating a tube having four walls, all of whose interior surfaces are formed as reflective surfaces.

FIG. 3 is a vertical sectional view of a simple optical system or a printer showing the final condensing of light at the film aperture by means of reflection employing a light path in accordance with the invention.

FIG. 4 is a similar view illustrating a form of light path with reflective surfaces converging toward the film aperture.

FIG. 5 is another similar view illustrating a light path with mirrors diverging towards the film aperture.

FIG. 6 is a schematic view illustrating the application of the invention to a contact printer.

FIG. 7 is a similar view illustrating the application of the invention to an optical or projection printer.

DESCRIPTION OF PREFERRED EMBODIMENTS

Figure 8:
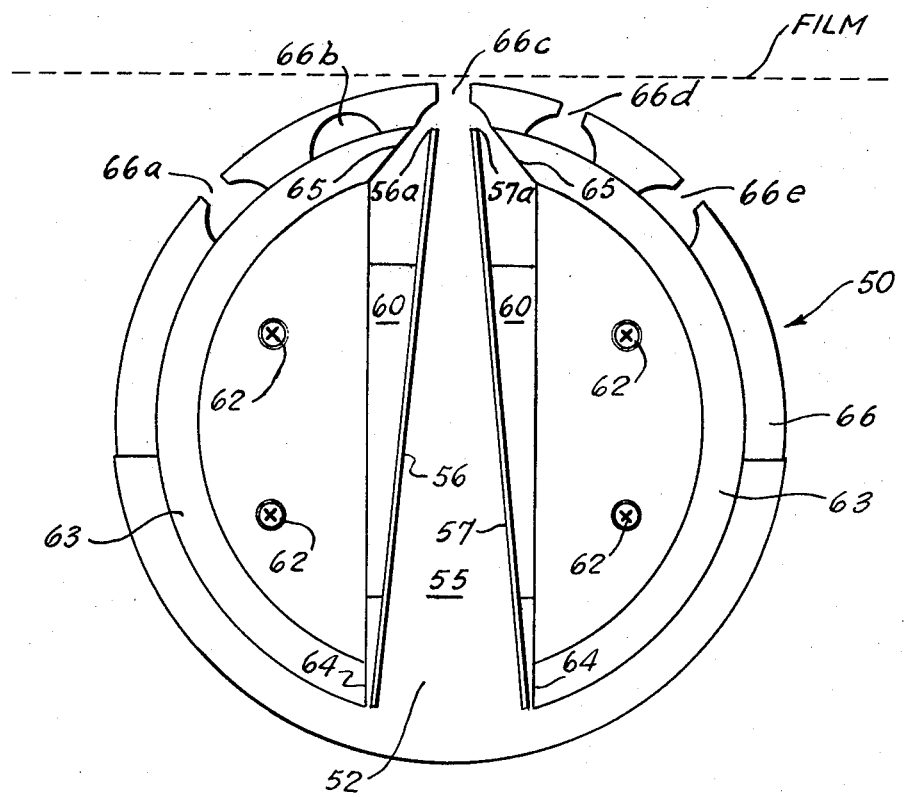
FIG. 8 is a plan view of a preferred form of condensing device according to the invention.

In FIG. 1 only the top and bottom walls 1 and 2 are shown in solid lines and the mirrored interior surface 3 of the bottom wall member 2 can be viewed in its entirety. It is to be understood that the under surface 4 of the top wall member 1 of the tube is similarly formed with a surface reflector. The tube in this instance could be completed by the use of side members 5 and 6, here shown merely in dotted lines, joining the walls 1 and 2 together but spacing them apart in the relationship shown. The side members 5 and 6 as here shown would not themselves have specially formed surface reflectors on their surfaces.

In FIG. 2, however, a complete tube generally indicated at 9 is shown. It has bottom walls 1 and 2 the same as in FIG. 1 and having the same reflective surfaces 3 and 4. Here, however, the side walls 5 and 6 have interior reflecting surfaces 7 and 8, so that light passed in at one end will not only be reflected back and forth between the top and bottom surface mirrors, but will also be reflected back and forth between the mirror surfaces 7 and 8 formed on the interiors of the side walls 5 and 6.

The application of the invention to so much of a printer as is necessary to obtain an understanding of the invention is illustrated in FIG. 3 Here, light from a source 19 is collected by a suitable lens 11, here shown as a double convex lens, and refracted by this lens at various angles as shown by the solid line 12, the dotted line 13 and the dot dash line 14. These light rays, merely illustrative of the multitude that would emerge at various angles due to the refractive action of the lens 11, are here shown as being introduced into the tube 9 at its entrant end 10. They travel through the tube reflected back and forth, due to their different angles of incidence and consequent equal angles of reflection, between the surfaces 3 and 4, as well as surfaces 7 and 8, until they emerge at angles and at various positions at the end of the tube or aperture 15, to pass through a negative film 16 being fed down past the aperture 15.

It is to be understood that spaced parallel sprocket members, only one, 17, of which is here illustrated, are employed for feeding the film 16 past the aperture 15 by means of their teeth 18. These sprockets are, of course, spaced apart so that their teeth 18 register with the perforations running along adjacent the edges of the film strip. Such sprockets have commonly been employed in printers where, instead of the reflective tube of the invention, condensing lenses have been positioned between the sprockets with the last lens of the set having an optical surface adjacent the film aperture 15. However, as already pointed out, such lens surface has a tendency to collect dust particles.

Rays of light passing through and rendered generally parallel by such a lens system cause streaks to be printed on the film passing continuously by. This is true whether it be film 20 being printed by contact printing as in FIG. 6, or film 21 being printed by optical or projection printing as in FIG. 7. It is believed to be clear from a consideration of FIG. 3, however, that no such forming of streaks as takes place with generally parallel rays impinging on the film can take place where practically all of the rays reach the aperture at angles by the reflective action of the tube surfaces.

Even though, as in the FIG. 3 showing, some light will pass directly through the middle of the lens 11 and go directly to the film without any reflection, it will be coming from the convex surface of the lens 11, and it will be intermingled with so much more light emerging from the reflective surfaces 1 and 2, that no likelihood of the printing of any streaks on the film 20 or 21 exists.

Just as much, or even more, light arrives at the film aperture 15 by the reflective action of the interior surfaces of the reflective tubes than in the use of condensing lenses, for a certain amount of light is lost by refraction in passing through the lenses. It is further significant, of course, that in the reflective system of the invention there is no surface lying across the light path and close to the aperture on which static charges can accumulate to attract dust particles. The open reflective tube of the invention embodies no such surface.

A slight modified form of the invention is illustrated in FIG. 4. Here the condensing device generally indicated at 25, is shown as having walls 26 and 27 inclined towards each other so that the opening at the light entrant end 28 is larger than the opening at the film aperture 29. In this instance, like that of FIGS. 2 and 3, front surface mirror surfaces may be applied to the inner surface 30 of the top wall 26, and the inner surface 31 of the bottom wall 27.

A side surface 32 is also shown. In his instance, only a single light ray 33 is shown emanating from the double convex lens 34, introduced into the condensing device 25 and reflected therethrough. It is, of course, to be understood that this showing of a single ray is for simplicity of illustration and that the same multitude of rays will proceed from the lens 34 into the condensing device 25, as will proceed from the lens 11 in FIG. 3 to impinge on opposed, reflective interior surfaces.

FIG. 5 illustrates substantially the reverse of FIG. 4 in that in this instance a condensing device 35 has its top wall 36 and its bottom wall 37 diverging from the entrant end 38 to the emerging end or printing aperture 39. Here, again, the emerging end 39 would be the size of the printing aperture so that the end 38 would be smaller than the same. The surfaces 40 and 41 on the interior of the walls 36 and 37 are surface mirrors while if desired the same is true of the surfaces 42 of the one side wall shown and the opposed surface of an other optional side wall, not here shown. Again, a ray 43 shown as emerging from a lens 44 impinges on the surface 41 and is reflected back and forth between the surfaces 41 and 40, until it emerges through the printing aperture 39. It passes thus through the negative film 16 and through the positive film 20 or 21, to be printed upon as the case may be, where the printer is either a contact or projection printer.

It is, of course, to be appreciated that in the showings of FIGS. 4 and 5, convergence or divergence of the opposed reflection surfaces of the devices 25 and 35 can just be with respect to the top and bottom walls of the tube, leaving the opposed side walls parallel; or side walls may be tapered similarly to the top and bottom walls so that device takes the form of a tube which either narrows or widens, both vertically and horizontally from its entrant end, 28 or 38, to its exit end 29 or 39. Also the reverse wall pattern can be followed.

Figure 9:
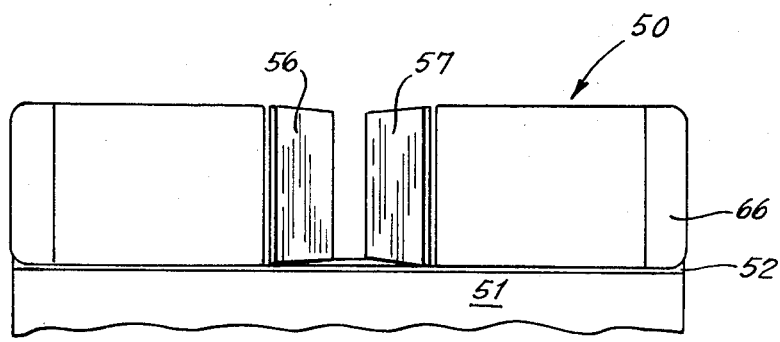
FIG. 9 is a view of the device of FIG. 8 taken at right angles to the showing of FIG. 8 and looking toward an aperture.

FIGS. 8 and 9 show a preferred operational embodiment of a light condensing arrangement according to the invention in detail. The apparatus of FIGS. 8 and 9 is generally indicated by the reference numeral 50, and is adapted to be mounted upon a fixture 51, which is shown in a generally horizontal attitude in FIG. 9, but which would actually be vertically oriented in a typical installation such as that schematically shown in FIG. 3.

The assembly 50 has a flat disc-shaped base 52 upon which two generally semicircular mirror support elements 53, 54 are mounted in opposed positions to define a longitudinal channel 55 there between. FIGS. 8 and 9 show two opposed mirrors 56 and 57, preferably mirrors of the front surface type, mounted within the channel 55. The use of front surface mirrors avoids the problems of internal reflection, absorbtion and refraction at the front surface which occur with ordinary mirrors having their reflective surface at the back. This is particularly important when the color distribution of light is to be maintained the same after reflection, because according to well known optical principals light at different wave lengths is refracted and absorbed differently.

A pair of wedges 60 fitted within the longitudinal channel 55, serve to position the mirrors 56 and 57 in the desired relationship to each other. Thus FIG. 8 shows the opposed mirrors 56 and 57 mounted so as to be inclined toward each other in the direction of the aperture. By the selection of appropriate wedges 60 the angle at which the mirrors are mounted can be set to achieve any of the relationships shown in FIGS. 3, 4 and 5. Converging inclination of the mirrors, as shown, is usually preferred, since such an arrangement provides more uniform illumination at the film plane than does the use of parallel mirrors. In accordance with Lambert's Law, parallel mirrors would illuminate the center of a film frame more brightly than its edges. This effect is controlled by the use of convergent mirrors.

Since the device 50 is normally mounted in a vertical plane as schematically illustrated in FIG. 3, the several mirror-positioning elements and the mirrors 56 and 57 themselves must be secured against displacement. As illustrated, a plurality of screws secure the elements 53 and 54 to the base 52. The wedges 60 can be secured in place by gluing or by screws, or by some other suitable means.

Two generally arcuate elements 63 surround the curved peripheries of the support elements 53 and 54, each of the elements 63 extending through somewhat less than 180°. At the entrant end of the longitudinal channel 55 the elements 63 have end faces 64 aligned with the flat sides of the elements 53 and 54 which define the channel 55. The faces 65 formed at the opposite ends of the elements 63, near the aperture or exit end of the device 50, are preferably inclined as shown in FIG. 8.

A rotatable arcuate member 66 is mounted concentrically with and outwardly of the elements 63. The member 66 has apertures 66a, 66b, 66c, 66d and 66e formed therethrough at radially spaced locations. By rotation of the member 66 any of the apertures 66a–e can be brought into alignment with the light path formed between the opposed mirrors 56 and 57. The apertures 66a–e have different shapes and sizes so that by selecting a suitable one of the apertures the concentrated light beam leaving the device 50 can be limited to a desired width — e.g. the size of a frame of film to be printed. One of the apertures is preferably of a suitable size to illumine a complete film frame, another is smaller, to block off light from a sound track, and so forth. The member 66 may suitably be somewhat larger than a semicircle so that it can be rotated freely to bring any of its apertures 66a–e into position, but will not become dismounted from the member 63, though some other rotatable mounting system might be employed. Some means, not illustrated, is provided for centering the selected aperture ahead of the mirrors.

As shown in FIG. 8, ends 56a and 57a of the mirrors 56 and 57 respectively are located inwardly of the member 66, so that the member 66 can be rotated to bring any of its apertures 66a – 66e in line with the light path defined between the mirrors 56 and 57. Preferably the mirror ends 56a and 57a are positioned close to the exit end of the light path, near the exit end of the light path formed by the device 50. Thus, in the embodiment shown in FIG. 8 the ends 56a and 57a are located just inside the radius defining the inner side of the element 66. The mirror ends 56a and 57a are also preferably beveled for better light distribution at the film.

Thus the light path defined by the device 50 and its mirrors 56 and 57 is completely unobstructed, and since the film to be printed will pass closely adjacent the selected aperture through the element 66, no transverse surfaces present themselves to gather dust or other particles which would obstruct the light passing to the film. Suitable means for advancing the film past the condensing device 50, close to, but not in contact with the element 66, are well known in the art.

In the preferred embodiment of the device 50, the several mounting elements 53, 54, 60, 63 and 66 for the mirrors 56 and 57 may be formed of metal or of synthetic resinous materials.

Finally it is appreciated that though light paths rectangular in cross section have been shown and described, other suitable cross sections can be employed so long as they pass all the light therethrough by reflection and are shaped down to a film aperture for properly illuminating the film.

It is believed that from the showing in the accompanying drawing and from the foregoing description, one skilled in the art will obtain a full understanding of the invention and will at the same time appreciate the various modifications may be made in the same and other embodiments may be devised without departing from the spirit or scope of the invention.

I claim

1. In an optical system for condensing light from a source and transmitting the same for emergence at an aperture, means forming a transversely unobstructed open ended light path, said light path being bounded throughout substantially the entire length of the path by only two flat front surface mirrors with said surfaces in opposed relationship whereby light directed in the entrant end of said path against one of said surfaces at an angle is reflected to said other into and then reflected back and forth between said surfaces to emerge as a concentrated beam at the exit end of said path, means mounting said front surface mirrors in spaced relationship and inclined towards each other in the direction toward the exit end of said path, means cooperating with said mounting means for setting the angle at which the mirrors are inclined toward each other to accommodate a particular light source, aperture means for engagement by a film at the exit end of said path, said aperture means being adjustable to provide apertures of different dimensions, and laterally enclosed transversely unobstructed passage means completing said path from the adjacent ends of said mirrors to said aperture means whereby no dirt can interfere with the even flooding of said film by light from said path.

2. An optical system as in claim 1 and including a light source, lens means positioned between said light source and said entrant end and formed to transmit light directly from said source into the open end of said light path between and against said opposed wall portions.

3. The optical system of claim 1 wherein the means for setting the angle at which the morrors are inclined toward each other include wedge means on said mounting means.

4. The optical system of claim 1 wherein ends of the mirrors nearest the exit end of the light path are beveled for even light distribution at the aperture.

* * * * *